Dec. 15, 1970    W. E. CHAPELLE ET AL    3,548,210
AUTOMATIC STEREOPLATTER Filed Aug. 30, 1965      6 Sheets-Sheet 1

*INVENTORS*
WALTER E. CHAPELLE
VERNON C. KAMM
ARLISS E. WHITESIDE

BY *Richard J. Seeger*
ATTORNEY

EQUATIONS $$S_X \equiv \frac{\partial Z}{\partial X}$$
$$S_Y \equiv \frac{\partial Z}{\partial Y}$$
$$\frac{\partial Z}{\partial X} \equiv \int \varepsilon S_X \, dt$$
$$\frac{\partial Z}{\partial Y} \equiv \int \varepsilon S_Y \, dt$$

INVENTORS
WALTER E. CHAPELLE
VERNON C. KAMM
ARLISS E. WHITESIDE

BY *Richard T. Seeger*
ATTORNEY

INVENTORS
WALTER E. CHAPELLE
VERNON C. KAMM
ARLISS E. WHITESIDE

United States Patent Office 3,548,210
Patented Dec. 15, 1970

3,548,210
AUTOMATIC STEREOPLOTTER
Walter E. Chapelle, Southfield, Vernon C. Kamm, Farmington, and Arliss E. Whiteside, Royal Oak, Mich., assignors to The Bendix Corporation, a corporation of Delaware
Filed Aug. 30, 1965, Ser. No. 483,462
Int. Cl. G05b 1/00
U.S. Cl. 250—202         7 Claims

ABSTRACT OF THE DISCLOSURE

An automatic stereoplotter which produces rectified, contoured images of an area by altering the scan of the area according to a predetermined mathematical relationship. The invention includes apparatus for providing improved plotting motion to reduce error in following a chosen contour. Accurate measurements of the slope of a given area, parallax, and degree of correlation are all used to minimize deviations of the plotting motion from the contour being followed. The control of the plotting motion is applied with respect to both the velocity and direction of that motion.

---

This invention pertains to apparatus for correlating a plurality of related images and more particularly to compensate during correlation for extraneous variations in said images and to accurately plot object surface characteristics from said images. This invention has particular application to stereo photogrammetry wherein contour and profile lines are located and plotted. A detailed consideration of general background in this art may be found in patent application Ser. No. 183,101 entitled "Stereoplotter" filed Mar. 28, 1962 by Knight V. Bailey and Daniel C. Kowalski, now Pat. No. 3,267,286 as well as patents in the art.

In comparing images such as aerial stereo photographic images, which are photos of the same terrain taken from different points, difficulty is encountered due to the fact that very seldom are the two photographs taken in the same horizontal plane due to the differences in altitude, roll, and yaw of the airplane during photographing. Due to these factors and other conditions such as camera constants well known in the art, a small section of an object surface will produce images having different shapes on the various photos. For optimum correlation and comparison of information from such images, it is necessary to compensate for the shape differences introduced by the above errors. This invention compensates for these errors by using a separate adjustable scan motion as the light source for each photographic image to scan a small area of each photographic image. The scanning motion for each image is shaped according to the known geometric distortions above referred to and also according to slope estimates of the object surface, by using partial derivatives of the photograph coordinates with respect to object coordinates.

The surface slopes are determined in this invention by integrating the product of the instantaneous measured parallax and the scan motion coordinates. The scan motion is shaped by the estimate of surface slope and by known geometric distortions.

This invention also provides improved plotting motions used to define contour and profile lines from stereo photographic images. This invention determines parallax elimination velocity by the quotient of the parallax and the surface slope to obtain a velocity proportional to the distance between the plotted contour line and the true contour line.

This invention further improves upon prior systems by determining the angle of the plotting velocity and also the angle of the parallax elimination velocity using the integral of a function of the parallax elimination velocity, or a component thereof, with respect to time. By using this integral, contours on small slopes are more easily plotted and also larger slopes are more accurately plotted.

This invention also improves on the determination of the plotting velocity used in automatic stereoplotting by utilizing a function of the parallax as well as a function of the correlation between the images. This results in a lower velocity as the parallax increases and results in a higher velocity as the parallax decreases. This improves the accuracy of the plotting since as the error or parallax increases, the velocity is decreased so that the parallax correction is made before the error can assume significant values.

These and other objects and advantages will become more apparent when preferred embodiments of this invention are discussed in connection with the drawings in which:

FIG. 6b is a block diagram with equations for the generate plotting motions block in FIG. 1 for contouring showing an alternate system to that shown in FIG. 6a.

In this description, X, Y, and Z will designate the model coordinates of the computed object point and $x_1$, $y_1$ will designate the photo coordinates of a first photo image, and $x_2$, $y_2$ will designate the photo coordinates of a second photo image. The term model coordinates is used instead of object coordinates since the model coordinate system used by the stereoplotter is normally a miniature of the true object coordinate system. The photo coordinates are determined by transforming the model coordinates in accordance with camera positions and altitudes at the times of taking of the stereo photographs, camera lens distortion, earth curvature, atmospheric diffraction and other factors which hereinafter will be referred to as orientation elements.

Figure 1:
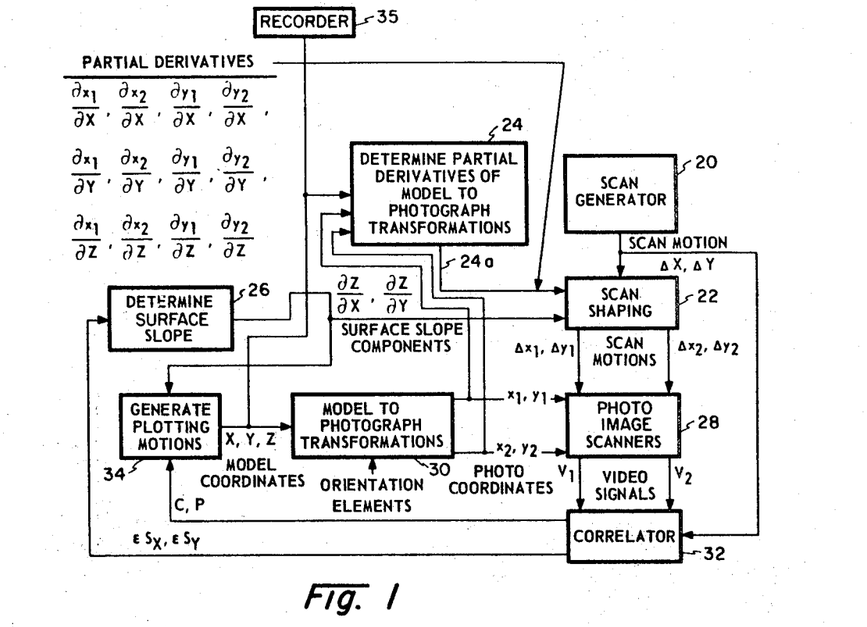
FIG. 1 is a block diagram of a preferred embodiment of this system.

In FIG. 1 is shown a block diagram of a preferred embodiment of this invention and this block diagram will be described briefly before the components thereof are described in more detail later in this description. Scan generator 20 develops a scan motion which may be a random scan or a scan following a desired pattern. The output of scan generator 20 is shaped by scan shaping circuitry 22 where the scanning motion is changed according to the partial derivatives received from the circuitry in box 24 and from the partial derivatives which indicate surface slope received from the circuitry in box 26. The shaping of the scan motion corrects for distortions in the photo image due to geometric projection distortion and surface slope. As will be explained in connection with FIG. 3, there are two separate scan motions produced, with each scan motion being shaped separately and differently. The manner in which the partial derivatives in boxes 24 and 26 are determined will be discussed hereinafter.

Figure 3:
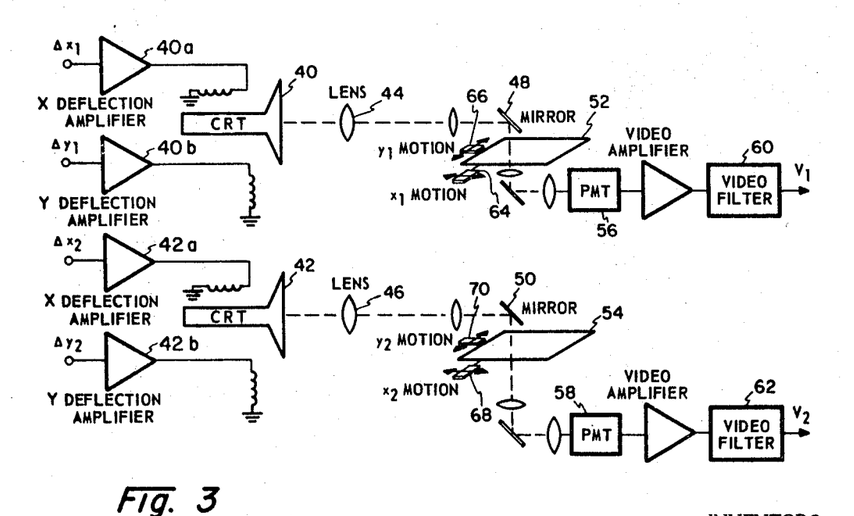
FIG. 3 is a diagrammatic showing of the scanning elements used in the photo image scanners block of FIG. 1.

A photo image scanner 28, which is shown in FIG. 3 in more detail, receives the shaped scan motions from the scan shaping circuitry 22 and receives photo coordinates $x_1$, $y_1$, $x_2$, $y_2$ from the model to photograph transformation circuitry 30 and develops two video signals $V_1$, $V_2$, which give information as to the light and dark areas in the respective photo images in the small area scanned in each of the photo images. Correlator 32, which is shown in more detail in FIG. 4, receives video signals $V_1$, $V_2$ from circuitry in the photo image scanner box 28 and also receives the scan motion $\Delta X$, $\Delta Y$ from scan generator 20. The correlator processes these signals and determines the correlation C and parallax P along with the error in surface slope $\epsilon S_X$ and $\epsilon S_Y$, which is the error in the estimate of the surface slope at the location of the scanning motions or patterns.

Model to photograph transformation circuit 30 transforms model coordinates X, Y, Z to corresponding photo coordinates $x_1$, $y_1$, $x_2$, $y_2$ utilizing orientation elements. This is done by using transformation equations well known in the art and obtainable from the Manual of Photogrammetry, American Society of Photogrammetry, 3rd. ed., 1965. These transformations can be accomplished by programming in any general purpose computer using techniques set forth in Guide to Fortran Programming by D. McCracken, John Wiley & Sons, 1961. Also, these transformations may be accomplished by following the procedures set forth in September 1961 issue of Photogrammetric Engineering, pp. 583 to 589 and in Canadian Surveyor, June 1963, pp. 155 to 168.

Circuitry for determining (estimating) the surface slope is shown in box 26. Box 26 receives $\epsilon S_X$ and $\epsilon S_Y$ from the correlator 32 and integrates and provides a new estimate of surface slopes $S_X$, $S_Y$, which also may be defined as $$\frac{\partial Z}{\partial X}, \frac{\partial Z}{\partial Y}$$

respectively.

Figure 6A:
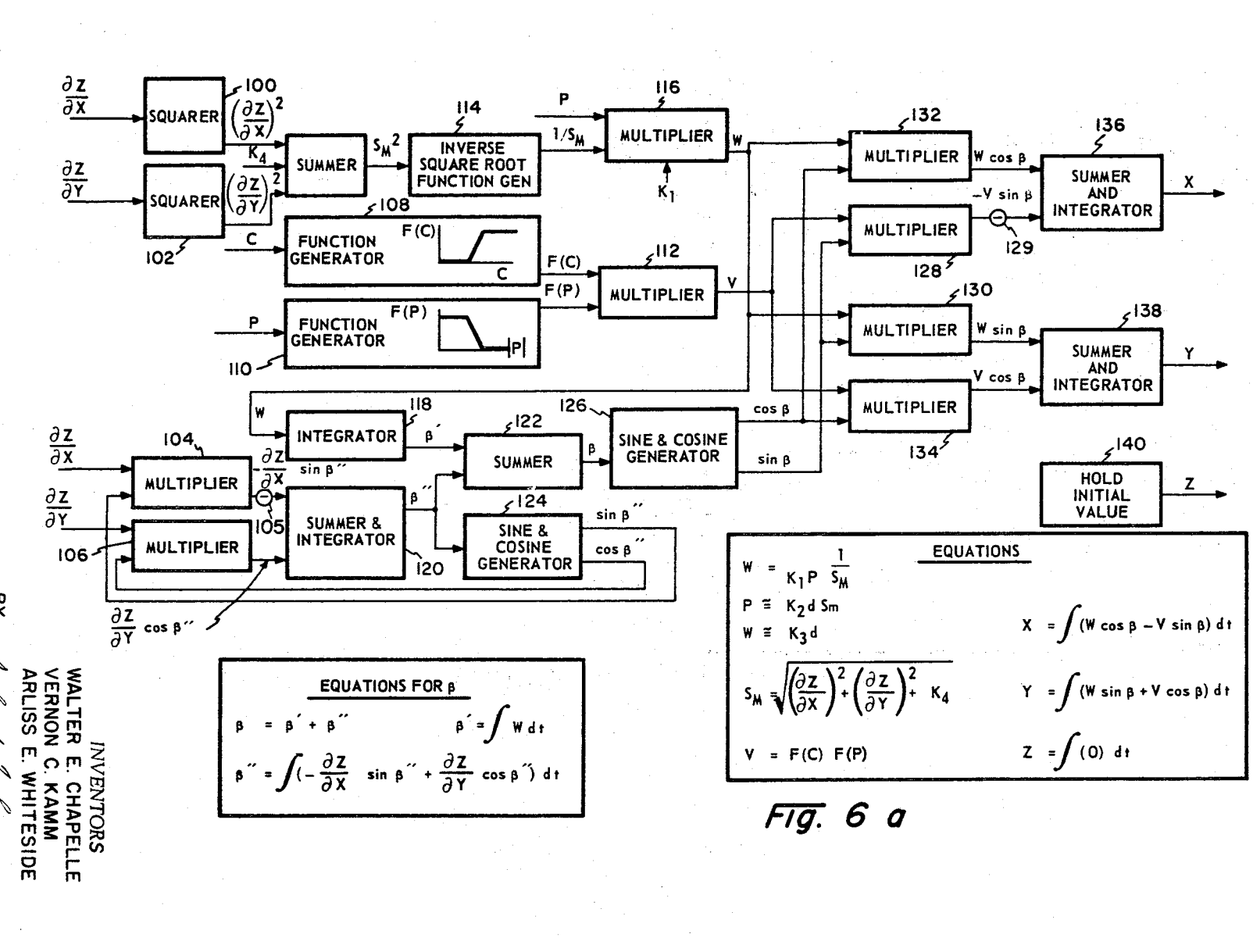
FIG. 6a is a block diagram with equations for the generate plotting motions block of FIG. 1 for contouring.
Figure 6B:
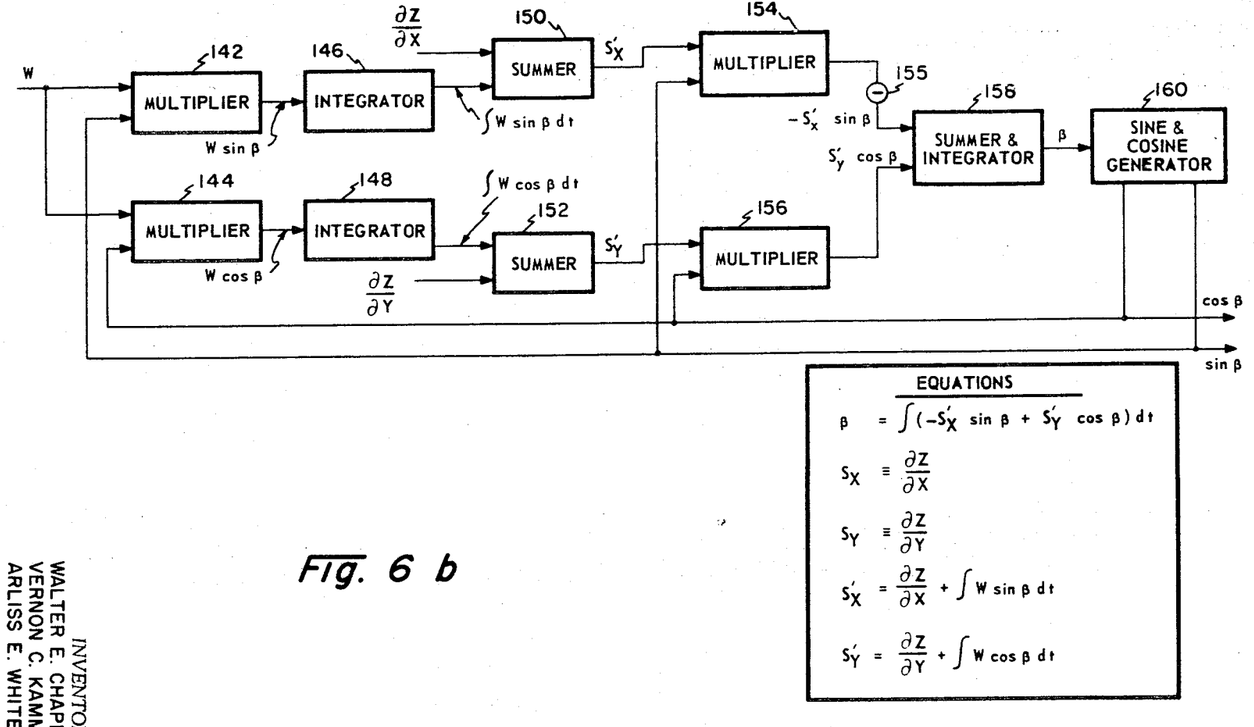
Figure 7:
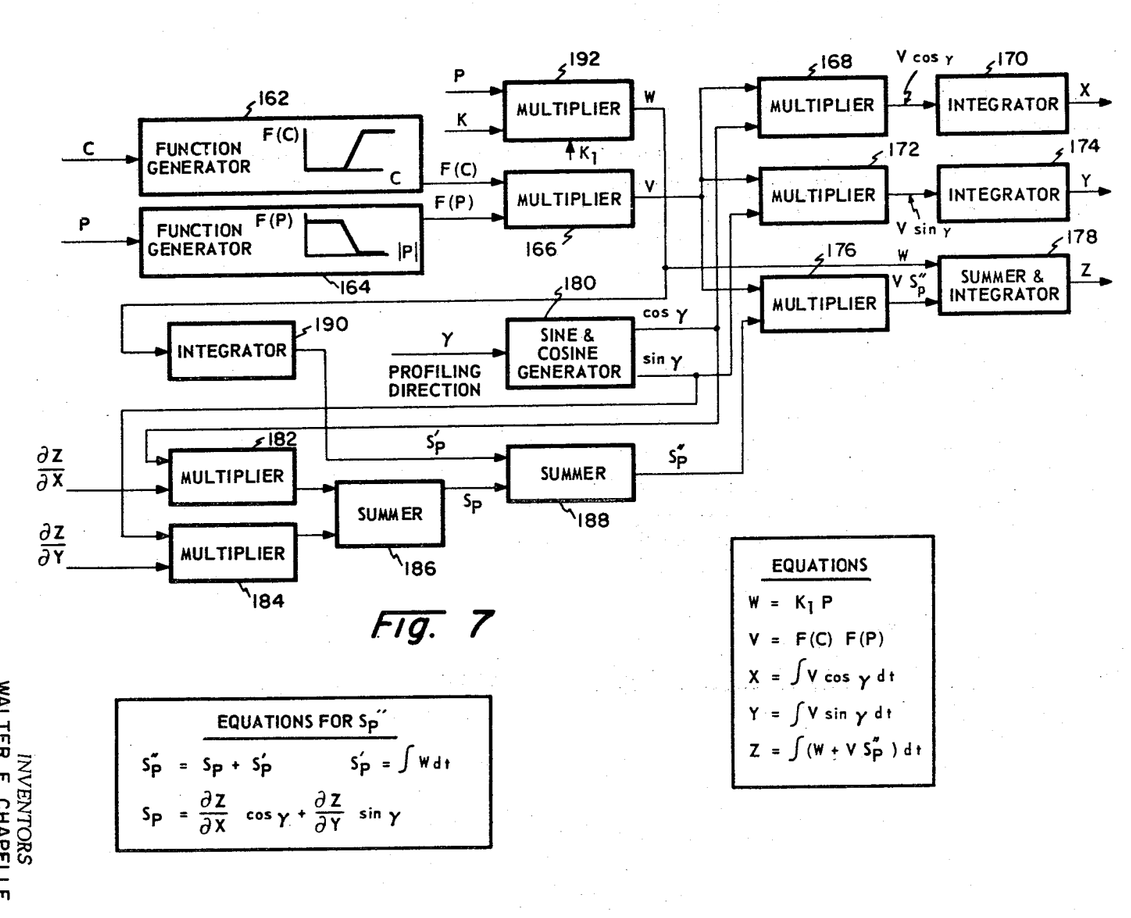
FIG. 7 is a block diagram with equations for the generate plotting motions block in FIG. 1 showing the profiling system.

Circuitry for generating the plotting motions, or changes in the model coordinates X, Y, and Z, is shown in detail in FIGS. 6a, 6b, and 7 and is indicated in FIG. 1 as box 34 which receives surface slope estimates $$\frac{\partial Z}{\partial X}, \frac{\partial Z}{\partial Y}$$

and the correlation C and parallax P from correlator 32. This invention in generating the parallax elimination velocity W utilizes not only the measured parallax P but also the slope estimate $S_M$. In this manner, as may be seen in the equations in FIG. 6a, W is proportional to $d$ which is the distance of the actual (computed) contour point from the true point of correlation so that a more useful relationship between W and the true contour line is obtained.

Also, this invention determines $\beta$, which is the angle of the surface slope at the point of contour, by including in the computation of the angle $\beta$ the integral with respect to time of the parallax elimination velocity. This provides added information which during the contouring of small slopes and acute changes of contour direction, increases accuracy and reliability. This concept is also used for determining $S_P'$, a function of the angle $\gamma$ which is the profiling direction.

Further, this invention provides for determining V, which is the plotting velocity, by making V not only dependent on a function of the correlation but also on a function of the parallax so that V is at a lower velocity when the parallax or error is high thereby limiting the amount of parallax that is attained while plotting.

As mentioned, box 24 has as inputs X, Y, and Z, the model coordinates and $x_1$, $y_1$, $x_2$, $y_2$, the photo coordinates and from this it sends to the scan shaping box 22 the partial derivatives indicated in line 24a. The general steps performed by box 24 and box 22 are to take the general transformation equation of a three dimensional object into a two dimensional projection, consider that the object is a surface, and obtain the orthographic projection by taking infinitesimal differences about an operating point, which differences are determined by partial differentiation and substitution of finite differences. General formula illustrating these steps are given below. Specific formula for the transformation may be found in the Manual of Photogrammetry, American Society of Photogrammetry, 3rd. ed., 1965.

Consider any transformation of projection type (1) $\qquad x = F(X, Y, Z)$
$\qquad y = F(X, Y, Z)$ Where $x, y$ = coordinates in a projective plane X, Y, Z = coordinates of an object.

Consider a surface as the object, then (2) $\qquad Z = F(X, Y)$

Consider the orthographic projection of the same object, then (3) X, Y = coordinates of orthographic projection.

If infinitesimal differences are taken about an operating point, the following is obtained by partial differentiation $$\Delta x = \frac{\partial x}{\partial X} \Delta X + \frac{\partial x}{\partial Y} \Delta Y + \frac{\partial x}{\partial Z} \Delta Z$$

$$\Delta y = \frac{\partial y}{\partial X} \Delta X + \frac{\partial y}{\partial Y} \Delta Y + \frac{\partial y}{\partial Z} \Delta Z$$

$$\Delta Z = \frac{\partial Z}{\partial X} \Delta X + \frac{\partial Z}{\partial X} \Delta Y$$

Substituting the last into the first $$\Delta x = \left(\frac{\partial x}{\partial X} + \frac{\partial x}{\partial Z} \frac{\partial Z}{\partial X}\right) \Delta X$$
$$+ \left(\frac{\partial x}{\partial Y} + \frac{\partial x}{\partial Z} \frac{\partial Z}{\partial Y}\right) \Delta Y$$
$$\Delta y = \left(\frac{\partial y}{\partial X} + \frac{\partial y}{\partial Z} \frac{\partial Z}{\partial X}\right) \Delta X$$
$$+ \left(\frac{\partial y}{\partial Y} + \frac{\partial Y}{\partial Z} \frac{\partial Z}{\partial Y}\right) \Delta Y$$

Finite differences may be substituted for the above infinitesimal differences may be substituted for the above in values of the finite quantities are in the range from .1 millimeter to five millimeters, which range is suitable for conventional aerial photography.

The particular function of the circuitry in box 24 is to determine the partial derivatives of model to photograph transformations from the formula referred to above. These partial derivatives may be determined by any general purpose computer utilizing the programming set forth in Guide to Fortran Programming by D. McCracken, John Wiley & Sons, 1961.

The partial derivatives so determined are received by scan shaping network 22 along with the surface slope partial derivatives $$\frac{\partial Z}{\partial X}, \frac{\partial Z}{\partial Y}$$

Figure 2:
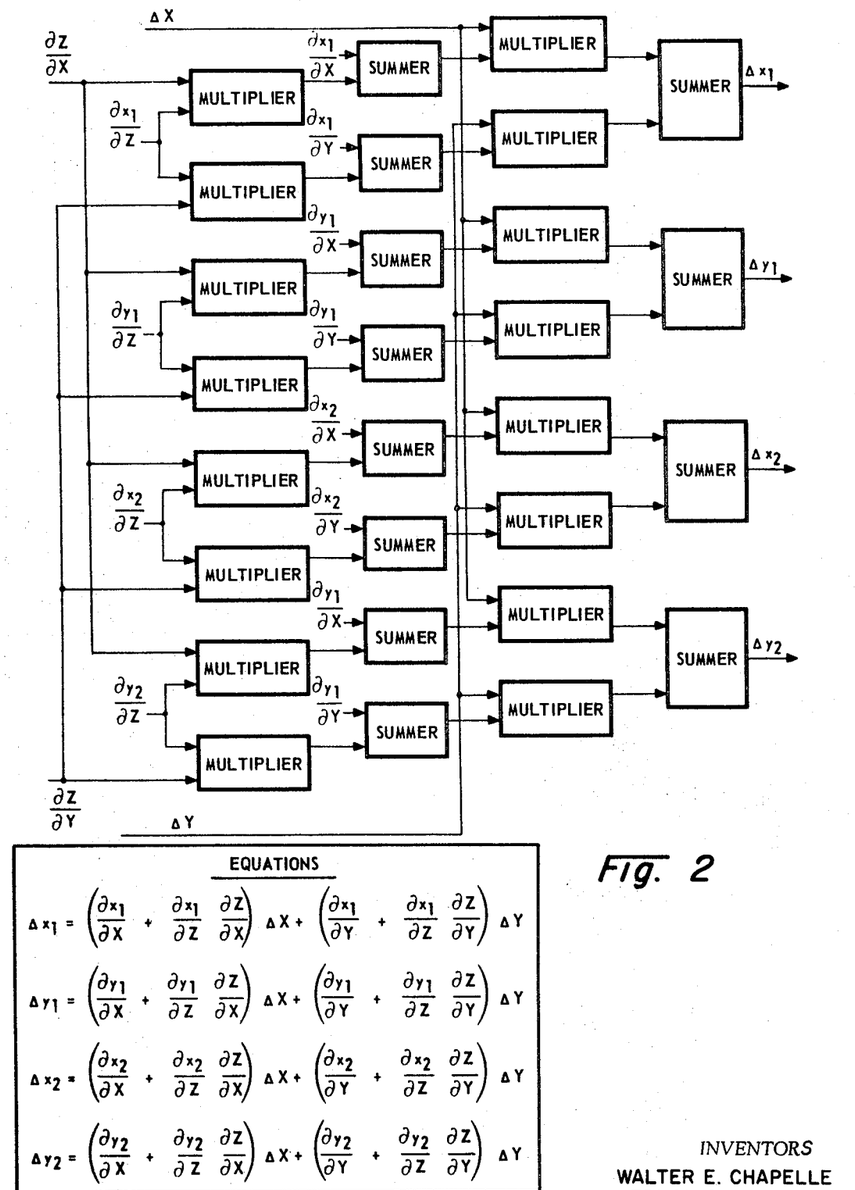
FIG. 2 is a block diagram with equations of the scan shaping block shown in FIG. 1.

The detailed circuitry for accomplishing the scan shaping is shown in FIG. 2 with a plurality of multipliers receiving the functions from circuits 24, 26, multiplying as indicated in the FIG. 2, summing the products with values received from circuit 24 as indicated in the FIG. 2, further multiplying the sums so received with the information received from scan generator 20 and summing the outputs of these last mentioned multipliers as indicated to obtain $\Delta x_1$, $\Delta y_1$, $\Delta x_2$, $\Delta y_2$, as indicated in FIG. 2. The functions performed by the circuit in FIG. 2 are shown in equation form in the box associated with FIG. 2.

All of the multipliers, summers, squares, square root function generators, integrators, sine and cosine generators, filters, differentiators, sign inverters, shown in FIG. 2 and other figures may be of conventional design and are commercially available.

The scan pattern coordinates $\Delta x_1$, $\Delta y_1$ are sent to the respective deflection amplifiers 40a, 40b for cathode ray tube 40 shown in FIG. 3. The scan pattern coordinates $\Delta x_2$, $\Delta y_2$ are sent to the respective deflection amplifiers 42a, 42b of cathode ray tube 42. The scan patterns are focussed respectively through lens 44, 46 and reflected off mirrors 48, 50 through the phototransparencies 52, 54 after which they are focussed and reflected to photomultiplier tubes 56, 58 respectively, amplified and passed through video filters 60, 62 to obtain video signals $V_1$, $V_2$. The photo coordinates $x_1$, $y_1$ are fed to servo motors 64, 66 respectively for moving photo image 52 in accordance with the signals developed by the circuitry in box 30 (FIG. 1) and photo coordinate signals $x_2$, $y_2$ are applied to servo motors 68, 70 to move the phototransparency 54 in the $x$ and $y$ direction respectively. Motors 64, 66, 68, 70 and the carriages associated therewith (not shown) are of conventional design and an example is illustrated in the above Bailey et al. patent application. By using two different cathode ray tubes 40, 42, separate scan patterns can be used for photo images 52, 54. The photo images 52, 54 are moved in the $x$ and $y$ direction in accordance with the plotting motion.

The motions of model coordinates produced by box 34 are recorded in recorder 35 in FIG. 1 to define the contour or profile line depending on which is being determined, as is usual in the prior art.

Figure 4:
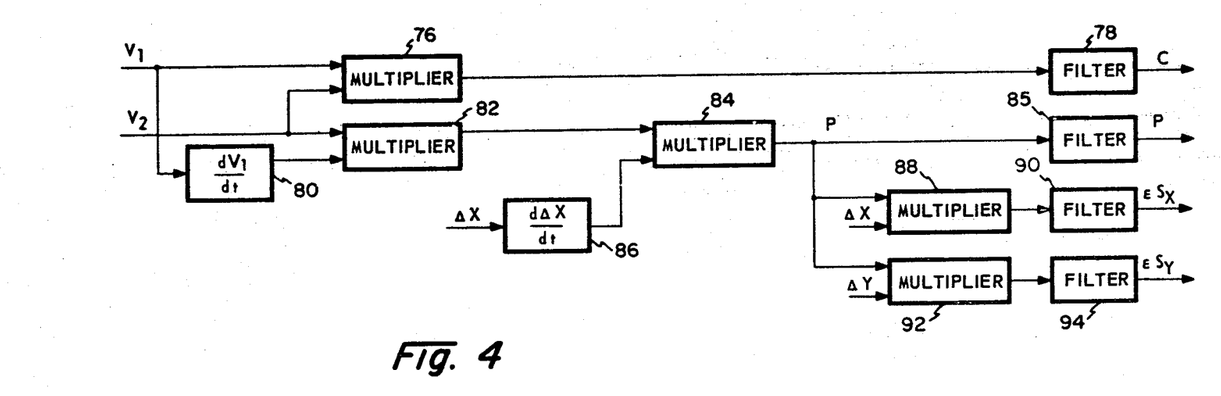
FIG. 4 is a block diagram of the correlator block shown in FIG. 1.

The correlator shown in FIG. 4 receives video signals $V_1$, $V_2$ respectively. Signal $V_1$ is multiplied with the signal $V_2$ in multiplier 76 and filtered in filter 78 to obtain C, the correlation value between signals $V_1$ and $V_2$, as is well known in the art. Signal $V_1$ is also differentiated by differentiator 80 and multiplied with $V_2$ in multiplier 82 and the product of which is multiplied in multiplier 84 with the differential of $\Delta X$ with respect to time. $d\Delta X/dt$ is obtained from differentiator 86. The product from multiplier 84 is filtered and this results in P, the parallax or relative displacement between the photographs used in producing signals $V_1$ and $V_2$. This portion of the correlator circuit shown in FIG. 4 is, as mentioned, well known in the art.

This invention measures P with respect to the scan coordinates $\Delta X$, $\Delta Y$ to determine scan shape errors and from this determines $\epsilon S_X$, $\epsilon S_Y$ or the slope errors. By comparing P with $\Delta X$, $\Delta Y$, the scan shape error is determined. If P were zero, there would be no scan shape error at that point. The product P from multiplier 84 is multiplied with $\Delta X$ in multiplier 88 with the product filtered in filter 90 to obtain $\epsilon S_X$ and the product from multiplier 84 is multiplied with $\Delta Y$ in multiplier 92 and filtered in filter 94 to obtain $\epsilon S_Y$.

Figure 5:
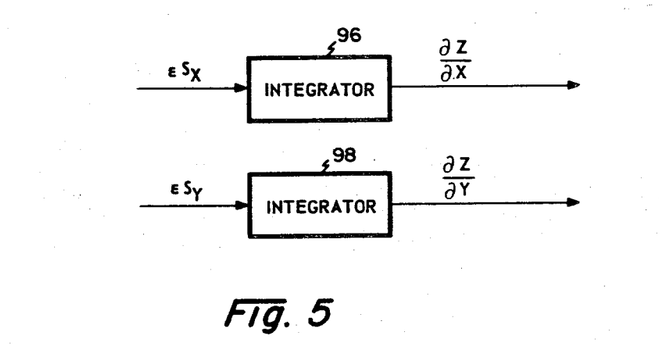
FIG. 5 is a block diagram with equations of the determine surface slope circuit in FIG. 1.

The surface slope is obtained, as previously mentioned, by integrating the quantities $\epsilon S_X$ and $\epsilon S_Y$ in integrators 96, 98 respectively, which are shown in FIG. 5. The results of the integration are $$\frac{\partial Z}{\partial X}$$

which is defined as $S_X$ and $$\frac{\partial Z}{\partial Y}$$

which is defined as $S_Y$.

Contouring plotting motions are determined in the diagram of FIG. 6a where the surface slope inputs from box 26 (FIG. 1) are applied to squarers 100, 102 and multipliers 104, 106. As shown, function generator 108 receives C and provides F (C) according to the general relationship indicated in box 108. In similar fashion, function generator 110 receives P and develops F (P) according to the general relationship shown in box 110. The outputs of function generators 108 and 110 are multiplied in multiplier 112 to obtain V the plotting velocity which in turn is multiplied with the cosine of $\beta$ and sine of $\beta$ to provide components for obtaining X and Y.

P is multiplied in multiplier 116 with the reciprocal of $S_M$ which is obtained from the inverse square root function generator 114 to obtain W which is integrated in integrator 118 with respect to time to obtain $\beta'$. The outputs of multipliers 104 and 106 are fed to summer and integrator 120 to obtain $\beta''$ which is added to $\beta'$ in summer 122 to obtain $\beta$ and which is applied to sine and cosine generator 124 to obtain sine of $\beta''$ and cosine of $\beta''$ which are fed back to multipliers 104 and 106. The sign of the output of multiplier 104 is inverted by inverter 105. Sine and cosine generator 126 take the sine of $\beta$ and cosine of $\beta$ which are applied to multipliers 128, 130, 132, 134 and are there multiplied with the quantities W and V as indicated in the drawing to obtain outputs which are summed and integrated in the circuitry of boxes 136, 138 to obtain X and Y. Z indicates the elevation contour and retains its initial value and is available at the output of box 140.

An alternate way for developing the contouring information cosine $\beta$, sine $\beta$ is shown in FIG. 6b where W is multiplied with the sine of $\beta$ and cosine of $\beta$ in multipliers 142, 144, integrated in integrators 146, 148 and then summed respectively with $$\frac{\partial Z}{\partial X}$$

in summer 150 to obtain $S_X'$ and the output of integrator 148 is summed with $$\frac{\partial Z}{\partial Y}$$

in summer 152 to obtain $S_Y'$. $S_X'$ is multiplied with the sine of $\beta$ in multiplier 154 and the sign of the product is inverted by inverter 155 and applied to summer and integrator 158 where it is summed and integrated with the product of multiplier 156 which takes the product of $S_Y'$ and the cosine of $\beta$. The output of integrator 158 is $\beta$ and sine and cosine generator 160 give the outputs cosine $\beta$, sine $\beta$.

The embodiment shown in FIG. 1 is also capable of profiling which may be accomplished by utilizing in box 34 the circuitry shown in FIG. 7. The quantities C and P are applied respectively to function generators 162, 164 to obtain the relationships shown therein and the outputs are multiplied in multiplier 166 to obtain V which is multiplied with the cosine of $\gamma$, where $\gamma$ is the profiling direction, in multiplier 168. The product from multiplier 168 is integrated in integrator 170 to obtain X. V is multiplied with the sine of $\gamma$ in multiplier 172 and the product is integrated in integrator 174 to obtain Y and V is multiplied in multiplier 176 with $S_P''$ and the product is summed with W and integrated in summer and integrator 178 to obtain Z.

$\partial Z/\partial X$ is multiplied with the cosine of $\gamma$, obtained from generator 180, in multiplier 182 and the product is summed with the product of $\partial Z/\partial Y$ and the sine of $\gamma$, obtained from generator 180, in multiplier 184. The sum from summer 186 is summed with $S_P'$, (the integral of W with respect to time), in summer 188 to obtain $S_P''$. $S_P'$ is obtained from integrator 190 which integrates the product from multiplier 192 with respect to time.

Although this invention has been disclosed and illustrated with reference to particular applications, the principles involved are susceptible of numerous other applications which will be apparent to persons skilled in the art. The invention is, therefore, to be limited only as indicated by the scope of the appended claims. In the following claims, the term "relative displacement," also above referred to as parallax, is that distance one scanning pattern must be moved to scan the exact same area in its photo image that the other scanning pattern is scanning in its photo image.

Having thus described our invention, we claim:

1. Apparatus comprising
   scanning means for scanning corresponding areas of a plurality of stereo images of an object having surface slopes thereon,
   means for measuring the relative displacement between the scanned areas of said images,
   means for moving said images relative to said scanning means in a plotting motion so as to follow a contour or profile line on said object surface,
   means for determining the angle of the plotting motion by utilizing a time integral of a function of the measured displacement.

2. The apparatus of claim 1 with
   said means for determining the angle of the plotting motion utilizing an integral of a trigonometric function of the plotting motion angle.

3. The apparatus of claim 1 with
   the function of the measured displacement being the relative displacement elimination velocity.

4. Apparatus comprising
   scanning means for scanning corresponding areas of a plurality of stereo images of an object having surface slopes thereon,
   means for measuring the relative displacement between the scanned areas of said images,
   means for moving said images relative to said scanning means in a plotting motion so as to follow a contour or profile line on said object surface,
   means for determining object surface slopes from the stereo images,
   said means for determining said surface slopes utilizing the time integral of a function of the measured relative displacement as a correction to the surface slope.

5. The apparatus of claim 4 with
   said surface slope having components in two directions,
   each of said slope components being determined by utilizing the time integral of a function of the measured relative displacement.

6. The apparatus of claim 4 wherein
   said function of measured relative displacement includes a trigonometric function of the slope angle.

7. Apparatus comprising
   scanning means for scanning corresponding areas a plurality of stereo images of an object having surface slopes thereon,
   means for measuring the relative displacement between the scanned areas of said images,
   means for moving said images relative to said scanning means in a plotting motion so as to follow a contour or profile line on an object surface,
   means for providing a relative displacement elimination velocity in addition to said plotting motion,
   means for determining the angle of said displacement elimination velocity by utilizing the time integral of a function of the measured relative displacement elimination velocity,
   means for determining the angle of the plotting motion by utilizing the time integral of a function of the measured relative displacement elimination velocity.

References Cited

UNITED STATES PATENTS

| | | | |
|---|---|---|---|
| 3,432,674 | 3/1969 | Hobrough | 250—220 |
| 3,004,464 | 10/1961 | Leighton et al. | 250—220 |
| 3,145,303 | 8/1964 | Hobrough | 250—220 |
| 3,372,615 | 3/1968 | Birnbaum et al. | 250—220 |

RODNEY D. BENNETT, Jr., Primary Examiner

J. G. BAXTER, Assistant Examiner

U.S. Cl. X.R.

250—220

UNITED STATES PATENT OFFICE
CERTIFICATE OF CORRECTION

Patent No. 3,548,210                        Dated December 15, 1970

Inventor(s) Walter E. Chapelle et al.

It is certified that error appears in the above-identified patent and that said Letters Patent are hereby corrected as shown below:

Column 4, line 45, $\frac{\partial Y}{\partial Z}$ should read $\frac{\partial y}{\partial Z}$ Column 4, line 47, "differences may be substituted for the above in" should read -- quantities. In the preferred embodiment, the --.

Signed and sealed this 30th day of November 1971.

(SEAL)
Attest:

EDWARD M. FLETCHER, JR.            ROBERT GOTTSCHALK
Attesting Officer                     Acting Commissioner of Paten